(12) United States Patent
Blumenthal (10) Patent No.: US 7,762,945 B2
(45) Date of Patent: *Jul. 27, 2010

(54) COMPUTER-IMPLEMENTED METHOD AND SYSTEM FOR PROVIDING FEEDBACK DURING SEX PLAY

(75) Inventor: Yacob Blumenthal, Rosh Ha'Ayin (IL)

(73) Assignee: E.B.T. Interactive Ltd., Barkan (IL)

( * ) Notice: Subject to any disclaimer, the term of this patent is extended or adjusted under 35 U.S.C. 154(b) by 1687 days.

This patent is subject to a terminal disclaimer.

(21) Appl. No.: 10/962,663

(22) Filed: Oct. 13, 2004

(65) Prior Publication Data

US 2006/0079732 A1    Apr. 13, 2006

(51) Int. Cl.
*A61F 5/00* (2006.01)
(52) U.S. Cl. ........................................................ 600/38
(58) Field of Classification Search ............. 600/38–41; 434/114, 118, 225, 247, 257, 262, 307 R, 434/315, 316, 423
See application file for complete search history.

(56) References Cited

U.S. PATENT DOCUMENTS

| 4,771,344 A | 9/1988 | Fallacaro et al. |
| 4,954,697 A | 9/1990 | Kokubun et al. |
| 5,174,759 A | 12/1992 | Preston et al. |
| 5,515,424 A | 5/1996 | Kenney |
| 5,739,811 A | 4/1998 | Rosenberg et al. |
| 5,844,547 A | 12/1998 | Minakuchi et al. |
| 5,845,263 A | 12/1998 | Camaisa et al. |
| 6,368,268 B1 | 4/2002 | Sandvick et al. |
| 6,695,770 B1 | 2/2004 | Choy et al. |
| 6,747,632 B2 | 6/2004 | Howard |
| 6,793,619 B1 | 9/2004 | Blumental |
| 2002/0024500 A1 | 2/2002 | Howard |

FOREIGN PATENT DOCUMENTS

| EP | 0347415 B1 | 12/1989 |
| WO | WO 88/06077 | 8/1988 |

OTHER PUBLICATIONS

Web Cast Virtual Sex Machine, Dec. 1998.
IBM Corp., "Touch Sensitive Overlay With Tactile Feedback", *IBM Technical Disclosure Bulletin*, vol. 29, No. 2, Jul. 1986.

*Primary Examiner*—John P Lacyk
(74) *Attorney, Agent, or Firm*—Browdy and Neimark, PLLC (57) ABSTRACT

A computer-implemented method and system for providing feedback during sex play using a sensor worn on a user's body part to input motion-dependent signals to a computer during free motion of the body part. A computer accesses a plurality of computer-accessible erotic movie sequences and displays on a display device connected to the computer successive ones of the erotic movie-sequences in accordance with the motion-dependent signals.

35 Claims, 8 Drawing Sheets

COMPUTER-IMPLEMENTED METHOD AND SYSTEM FOR PROVIDING FEEDBACK DURING SEX PLAY

FIELD OF THE INVENTION

This invention relates to interactive display and manipulation of computer images.

BACKGROUND OF THE INVENTION

It is known to use tactile feedback as a component of sex therapy. It is known that sexual dysfunction is commonly psychological rather than physiological in origin. To this extent, the cure of sexual dysfunction is usually predicated on the gradual building up of a patient's self-confidence, using various means for inducing sexual stimulation. Use of surrogate partners in live sex therapy, is an extreme and often unacceptable approach and has been supplemented during the past few years by computer-generated techniques to simulate the sensation of feel during sex play.

U.S. Pat. No. 6,793,619 (Blumental) published Sep. 21, 2004 and entitled "Computer implemented method and system for giving a user an impression of tactile feedback" discloses computer-implemented method and system for giving a user an impression of tactile feedback. This patent is commonly assigned to the present assignee and is incorporated herein by reference. A computer is coupled to a memory storing therein a plurality of computer-accessible movie sequences of at least one image relating to a predetermined subject. An appliance is associated with the at least one image, and at least one data input source is associated with the appliance for inputting tactile-dependent signals to the computer. A display device is connected to the computer for displaying one of the movie-sequences in accordance with the tactile-dependent signals. In a preferred embodiment, the appliance is shaped to resemble a body part, particularly a male or female sex organ and live erotic movie sequences are displayed based on the user's interaction therewith.

U.S. Pat. No. 6,368,268 (Sandvick et al.) published Apr. 9, 2002, entitled "Method and device for interactive virtual control of sexual aids using digital computer networks" and incorporated herein by reference describes an interactive virtual sexual stimulation system. A person at a first user interface controls a stimulation device(s) located at a second user interface. The first and second user interfaces may be connected, for instance, through a web site on the Internet. In another embodiment, a person at a user interface may interact with a prerecorded video feed such that the prerecorded video feed controls the stimulation device(s).

U.S. Pat. No. 6,695,770 (Choy et al.) published Feb. 24, 2004, entitled "Simulated human interaction systems" and incorporated herein by reference discloses an apparatus for providing a virtual reality sexual experience. The apparatus includes audio reproduction means, visual reproduction means and tactile means for sexual stimulation. The apparatus further comprises a control system to correlate the audio means, visual means and tactile means to relate to one another to simulate a sexual experience. The apparatus provides a scenario for audio and visual outputs which is selected from a database and advances in a manner corresponding to user movements and engagement with the tactile system. The user simulates a sexual encounter with a doll having sensors which provide control signals to the control system to alter the audio and the visual outputs corresponding to physical interaction of the user with the part of the doll.

The displayed images engage in a sexual activity that mimics the action of the user with the doll thereby providing tactile feedback that further stimulates the user. The images are animated computer generated avatars that are software-controlled based on inputs received from the user(s) using limb-tracking devices that allow the software to know exactly what each user is doing and to use motion capture for attaching life-like attributes to the computer-generated avatar.

In one embodiment the apparatus is used with a head mounted display system and a movement and position sensing device applied to a critical part or parts of the body of the user. For example, the sensing device may be in the form of a digital glove type device which fits over the hand or the back of the hand of the user and from an initial position tracks movement and causes visual images and corresponding sounds to be selected from the database in a corresponding manner.

It is clear that any glove type device is distracting, uncomfortable and highly intrusive. These factors clearly reduce the quality of sexual stimulation when used for masturbation.

U.S. Pat. No. 6,747,632 (Howard) published Jun. 8, 2004 and entitled "Wireless control device" discloses a wireless control device having a small, lightweight housing worn by an operator, for example on the operator's wrist, and a controlled device, for example a personal computer. Several optical emitters, preferably light emitting diodes operating in the infrared range, and several optical detectors are provided on the housing. At least one x-axis emitter-detector pair operates to detect an x-direction of a pointing motion or gesture, and at least one y-axis emitter-detector pair operates to detect a y-direction of a pointing motion or gesture. The device is adapted to send optical beams to the user's bent fingers and to be reflected thereby so that when the fingers are bent, they intercept one or more optical beams emitted by the device, thus enabling movement detection and identification of which finger or fingers have been bent. This motion can then be used to cause a response in the controlled device. For example, angles of the operator's hand at the wrist can be interpreted to induce motion of a cursor on a computer display. However, if the whole hand is bent as it inevitably must be when gripping the circumference of an object, particularly an object of sufficiently narrow profile that it is completely encircled by the hand, the optical beams will not be intercepted and differentiation is then no longer possible. The device may also include a motion sensor, an environmental condition sensor, or a voice recognition sensor, and can also be adapted for gesture recognition and image scanning applications.

SUMMARY OF THE INVENTION

It is a principal object of the invention to provide supplementary sexual stimulation during masturbation without the need to wear cumbersome devices such as gloves which are intrusive.

According to a broad aspect of the invention, there is provided a computer-implemented method for providing feedback during sex play, the method comprising:

using a sensor worn on a user's body part to input motion-dependent signals to a computer during free motion of said body part;

accessing a plurality of computer-accessible erotic movie sequences; and displaying on a display device connected to the computer successive ones of said erotic movie-sequences in accordance with said motion-dependent signals.

Preferably, the motion-dependent signals allow selection of pre-stored images according to the distance of a user's hand from a nominal origin and the rate of movement of the user's hand as determined by a sensor worn on the user's wrist like a watch. The sensor signals may be supplemented using an auxiliary sex aid in the form of an appliance having sensors that are sensitive to the order, rate and/or pressure with which the sensors are operated. The movie images may be computer-generated non-animated images as suggested by U.S. Pat. No. 6,695,770. However, preferably the movies show live artists engaging in physical encounters that suggest the desired sensation. More particularly, when used as a sex aid, the feedback is achieved using a regular DVD or comparable medium that is pre-processed so as to display different sex acts according to actions performed by the user with one or more sex appliances.

Within the context of the description and appended claims it is to be understood that the term "computer" embraces any device that is adapted to display movie sequences and has a processor that allows connection of an appliance for inputting tactile-dependent signals to the computer. Thus, apart from being a computer in the generally accepted sense, the computer can be a mobile telephone having a suitable interface for connecting an appliance thereto. Such an interface need not, of course, required direct coupling and may be served by the IR interface now provided as standard on up-market cellular telephones.

Likewise, within the context of the description and appended claims it is to be understood that the term "live" as applied to movie implies that the movie is not computer generated or animated but uses live actors and actresses to act out a theme associated with the appliance. In saying this, the claims are not intended to preclude animation effects that are superimposed on such a movie or that are provided in addition thereto.

BRIEF DESCRIPTION OF THE DRAWINGS

In order to understand the invention and to see how it may be carried out in practice, some preferred embodiments will now be described, by way of non-limiting example only, with reference to the accompanying drawings, in which.

DETAILED DESCRIPTION OF EXEMPLARY EMBODIMENTS

Figure 1:
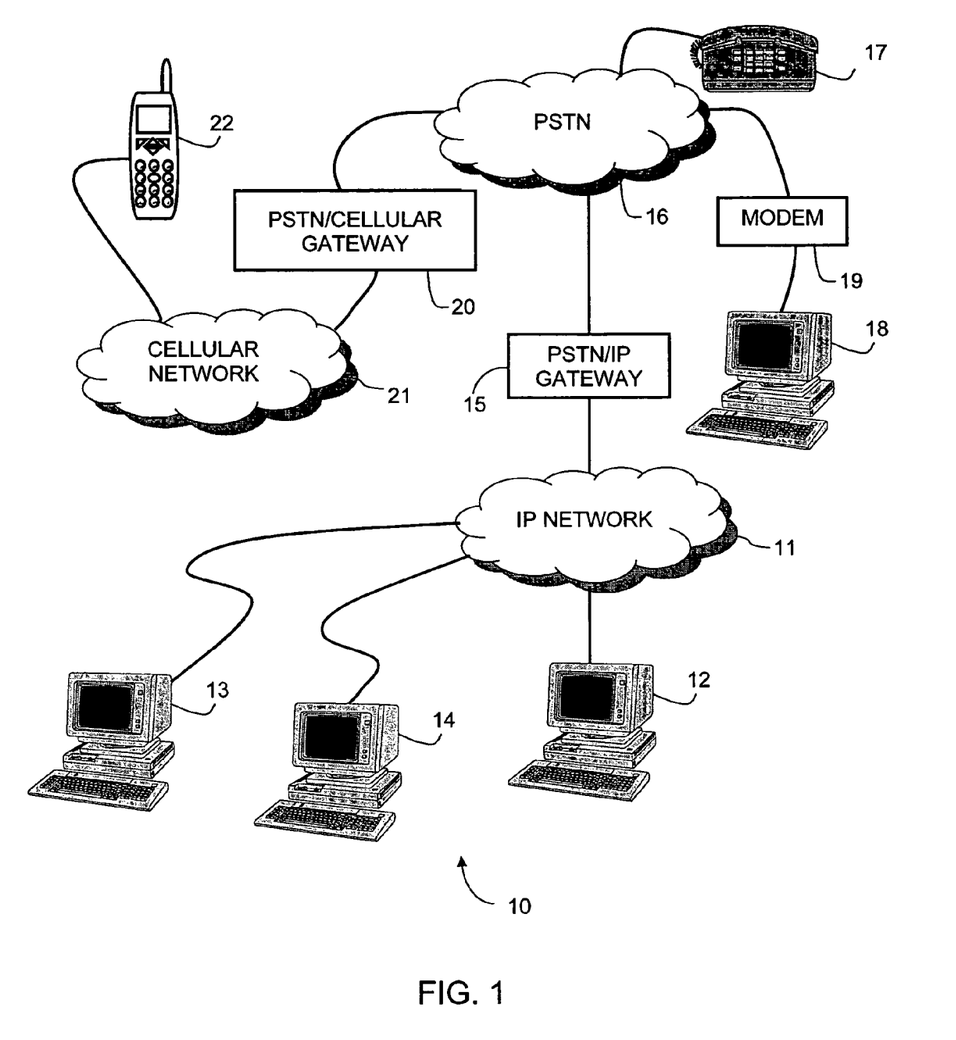
FIG. 1 is a block diagram showing functionally a system according to the invention.

FIG. 1 shows a computer-implemented system depicted generally as 10 for providing feedback during sex play. The system 10 depicts a hybrid communication network comprising an IP network 11 to which there is connected a web server 12 and one or more computers 13 and 14, which will be referred to as local and remote computers used by local and remote users respectively. The IP network 11 is coupled by a PSTN/IP gateway 15 to a PSTN 16 to which there are connected a regular telephone 17 and a computer 18 via a modem 19. The PSTN 16 is likewise connected via a PSTN/Cellular gateway 20 to a cellular network 21 to which one or more cellular telephones 22 are connected. Signaling and media are conveyed from one network to the other via the PSTN/IP gateway 15 or the PSTN/Cellular gateway 20, which operate in a manner well known in the art to convert the signals between PSTN and IP or PSTN and Cellular protocols and vice versa.

Figure 2:
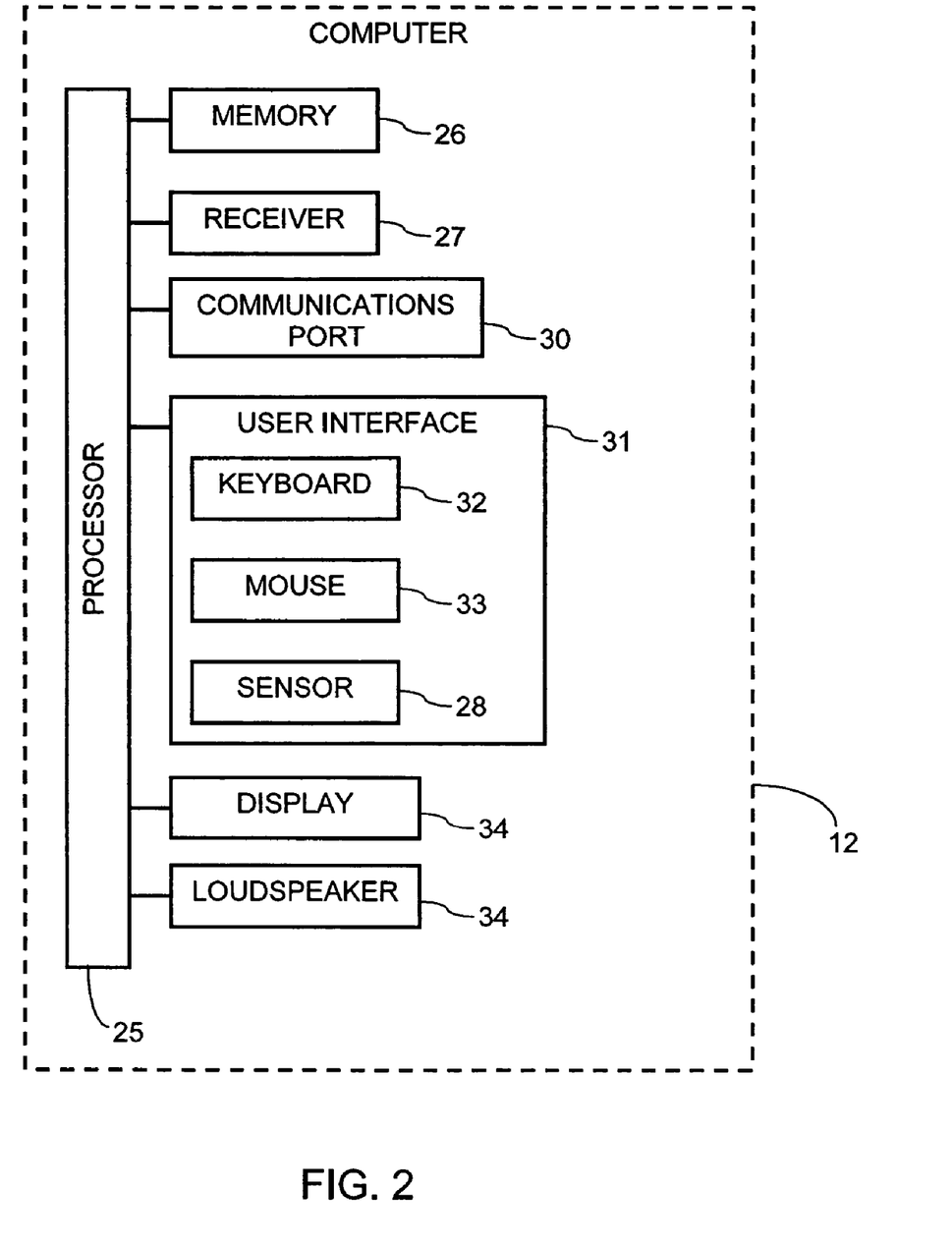
FIG. 2 is a block diagram showing functionally a computer for use with the system depicted in FIG. 1.
Figure 3:
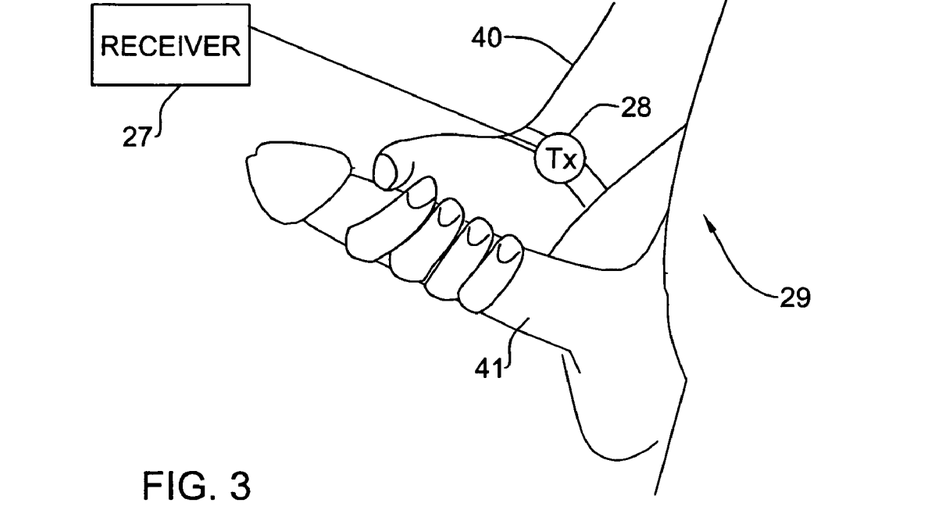
FIGS. 3 and 4 are pictorial representations showing use of a wrist-mounted sensor during successive stages of sex play with the system shown in FIG. 1.
Figure 4:
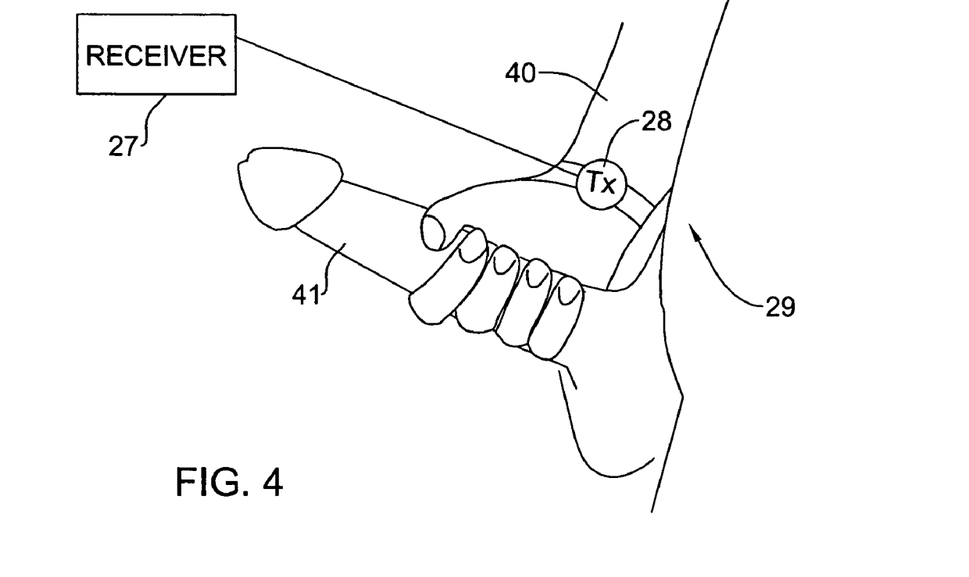

Referring to FIGS. 2 to 4 there will now be described the computer 13, 14 each of which comprises a processor 25 coupled to a memory 26 storing therein a plurality of computer-accessible erotic movie sequences. Preferably, as will be described below with reference to FIGS. 7 and 8, the erotic movie sequences are "live" sequences derived using a preformatted DVD or comparable computer-readable medium. However, they may also be computer generated since the specific manner in which the erotic video images are derived is not the principal feature of the present invention. A receiver 27 is coupled to the processor 25 for receiving sensor signals from a wrist mounted sensor 28 worn by a user 29 both shown in FIGS. 3 and 4.

A communications port 30 coupled to the processor 25 serves to connect the computers 13, 14 to each other via the IP network 11, which may be the Internet or an intranet or any equivalent network. The user 29 can interact with the computers 13, 14 via a user interface 31, which may include a keyboard 32 and a mouse 33 in addition to the wrist mounted sensor 28 shown in FIGS. 3 and 4. Thus the sensor 28 is not coupled directly to the computers 13, 14 but it is still part of the user interface 31 since it serves to allow the user 29 to input motion-dependent signals to the computers for either local or remote processing as explained below. The erotic movie sequences or sections thereof may be displayed on display 34 and associated sound tracks may be vocalized via a loudspeaker 35 both coupled to the processor 25.

The user interface 31 may include other sensors so as to provide feedback of a user's emotional response. For example, as the user's heart beat varies, a varying signal may be fed from a pulsimeter attached to the user's wrist, for example, to the computer, which is programmed to display, for example, a pulsating heart whose rate of pulsation mimics the user's heart rate, thereby providing biofeedback to the user. If desired, the fed-back movie sequence shown on the display device may be specially selected to have a calming effect on the user. Other sensors may equally well be used to sense other physiological variables such as temperature, skin resistance and so on. These may be used in like manner to provide bio-feedback by controlling the image display or sound sequence according to the measured parameters.

Figure 5:
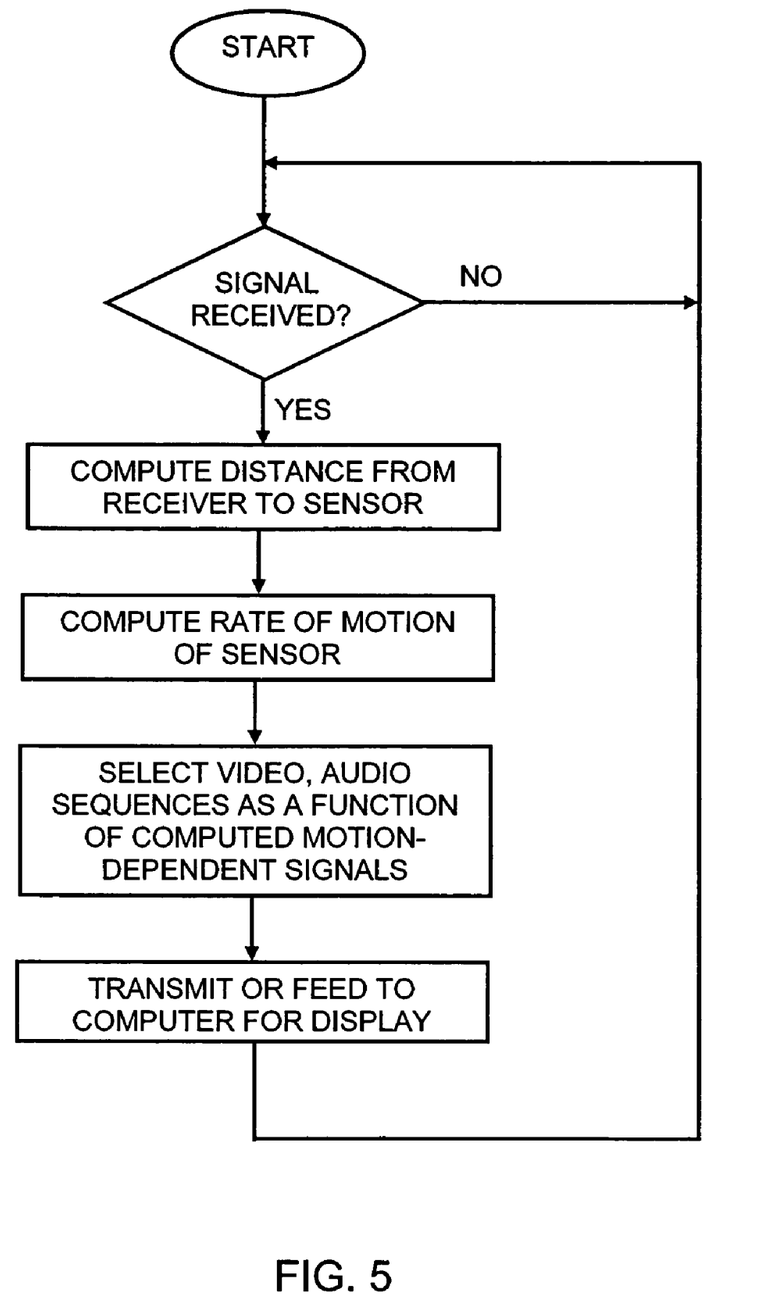
FIG. 5 is a flow diagram showing the principal actions associated with a method for providing tactile feedback using the system depicted in FIG. 1.
Figure 6:
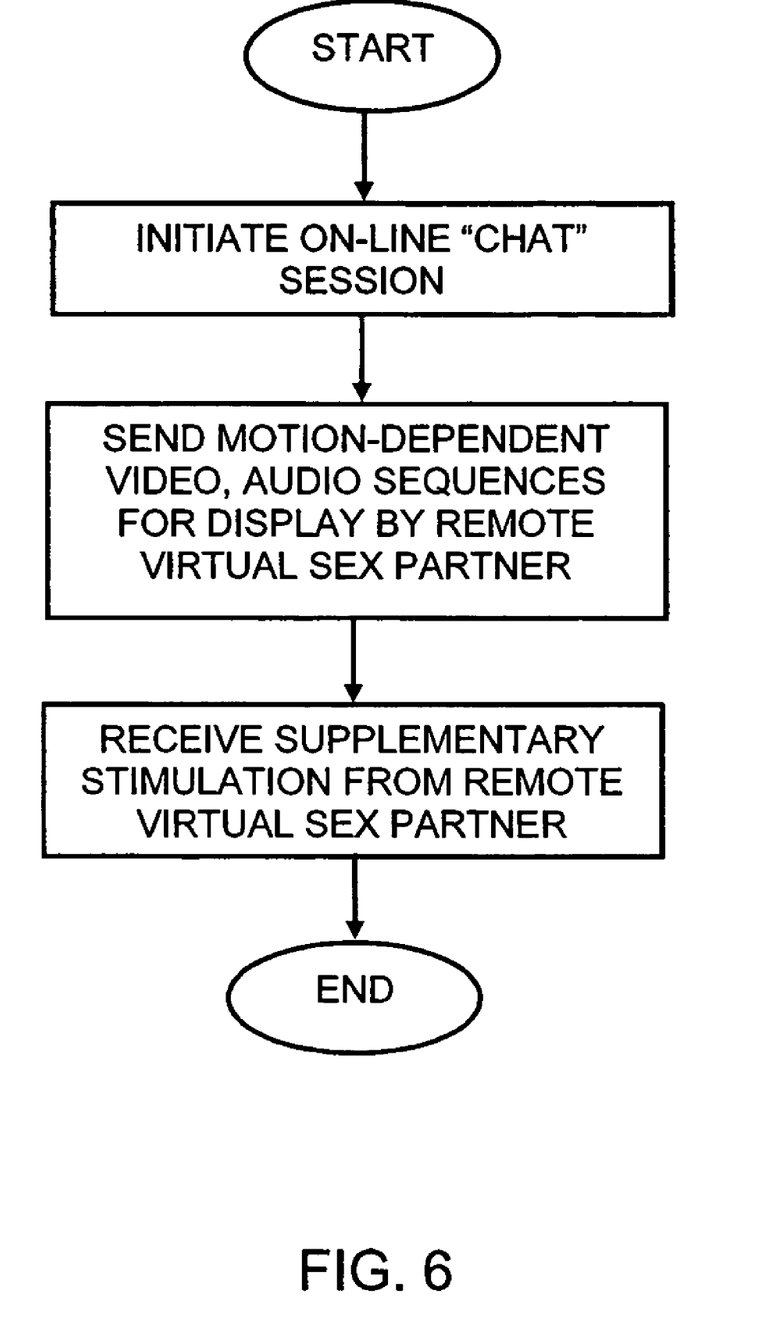
FIG. 6 is a flow diagram showing the principal actions associated with a method for providing tactile feedback during an on line chat session using the system depicted in FIG. 1.

FIG. 5 is a flow diagram showing the principal steps associated with use of the invention for displaying erotic video image frames during sex play, successive stages of which are depicted pictorially in FIGS. 3 and 4. Thus, as the user's hand 40 moves up and down the shaft of his penis 41 the distance of the wrist-mounted sensor 28 from the receiver 27 varies and the varying distance may be computed by the computer 13 or 14 based on the time to receive successive sensor signals. Likewise, the rate of play may be computed as a time derivative of the distance. During such action, the user's hand is completely exposed and unobstructed and motion is determined solely as the result of the to and fro motion of the user's wrist, which causes the distance between the wrist-mounted sensor 28 from the receiver 27 to vary. Thus, specifically, the user is free to stroke the shaft of the penis 41 using open fingers or to cup his or her fingers around the shaft of the penis since motion is not detected as a function of any interaction between the fingers and the wrist-mounted sensor 28. Upon receipt of sensor signals, the computer 13 or 14 computes the required motion-dependent signals (such as distance and rate) and uses the motion-dependent signals to determine which video frame to display in accordance with the distance of the sensor 28 from the receiver 27, and to vary the rate at which to display video frames on the display device 34 in accordance with rate of movement of the sensor 28 relative to the receiver 27, while vocalizing sound via the loudspeaker 35. The measurements are performed continually and successive frames are selected for display in real time at a rate that reflects the rate of motion of the user's hand (or other limb).

It will be understood that the flow diagram shown in FIG. 5 is simplified and partial. Thus, the computers 13 and 14 are described above as standalone devices to which both the sensor 28 and the receiver 27 are connected and which compute the motion-dependent signals for varying the rate of display of the movie frames. In practice, other configurations are also possible. For example, on receiving sensor signals from the local user at a receiver coupled to the local computer 13, the signals may be conveyed to the remote computer 14 for displaying an erotic video sequence thereat, whose content or rate varies as a function of the user's sex play activity. The resulting display allows the remote user to provide supplementary feedback signals, which at their most simple may be verbal encouragement relayed back to the local user. The remote user can convey such verbal encouragement during a live "chat" session over the Internet or even over the PSTN 16 via the telephone 17 while viewing the erotic video sequence via the computer 18, for example.

Alternatively, the web server 12 can operate as the remote computer for conveying erotic video sequences via the Internet, thus allowing the local user to access a particular Web site on the web server 12. Data may be pre-fetched to the user's site thus obviating the need for each page of sound or graphics data to be downloaded from the Web site in direct response to its selection if it already exists in the user's cache.

It will also be appreciated that the data can be fed to the user's computer locally via bulk storage media such as CD-ROM or DVD. According to one approach, a demo version of the application may be downloaded through the Internet or through the telephone line via a modem and a commercial version on CD-ROM may then be purchased for continued use. Such a commercial version of a movie must be adapted so as to allow the viewer to interact with the movie stars during replay. Specifically, sections that are amenable to such interaction must be marked so that the viewer knows when he is watching a section that allows interaction. Furthermore, the rate at which such sections are replayed must then be adjusted according to the rate of interaction of the user with the appliance.

It will be appreciated that although FIGS. 3 and 4 illustrate use by a male, the sensor 28 is equally suited for use by a woman who may wear the sensor on her wrist or any other suitable limb so that during sex play, the sensor 28 moves relative to the receiver 27 and thus allows video frames to be selected in accordance with the measured relative motion between the two. Thus, also in the case of a woman who masturbates, a sensor mounted on her wrist will move relative to a fixed receiver and thus allow operation of the system in analogous manner to that described above for male users.

Figure 7:
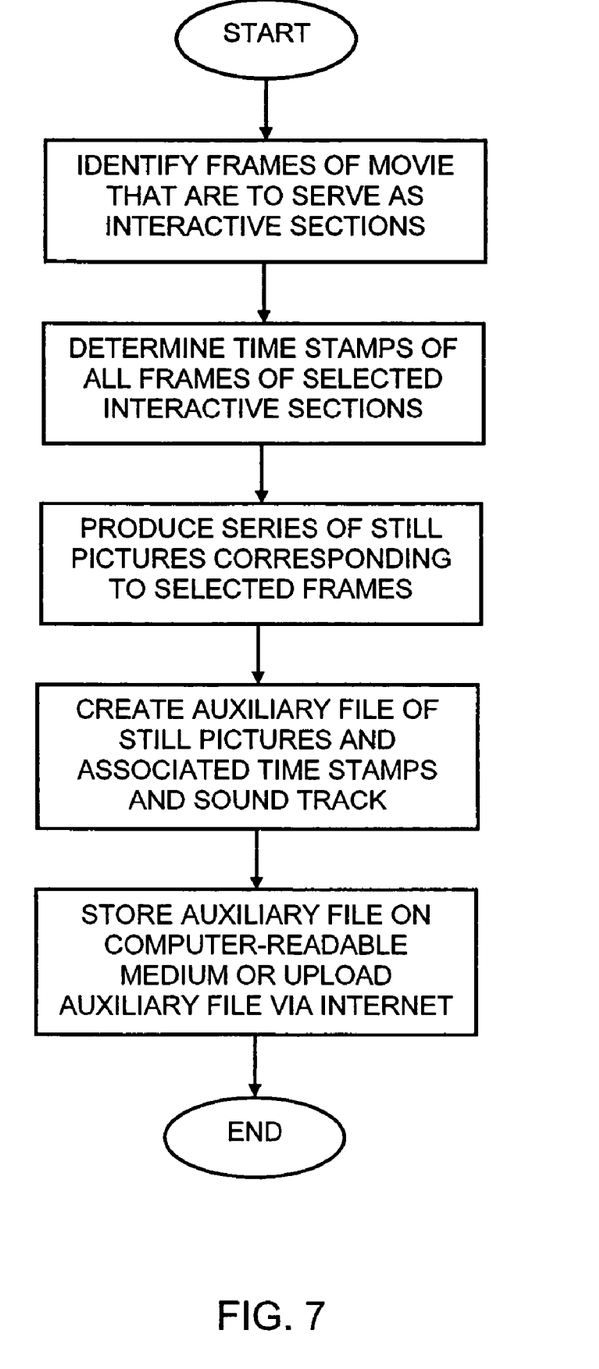
FIG. 7 is a flow diagram showing the principal actions associated with a method for formatting a DVD or other video medium to allow live interaction during replay.

FIG. 7 is a flow diagram showing the principal actions associated with one suitable method for formatting a video medium such as a DVD to allow live interaction during replay. Typically, the DVD contains a plurality of movie frames encoded in a suitable video format such as MPEG. An audio sound track is also provided that is synchronized to the movie data.

The video data is formatted by creating a file containing still images (frames) that correspond to one or more sections of movie data and contain a plurality of still images that may, for example, be in JPEG format. It is known when each frame of movie data is rendered relative to a predefined origin, typically being the start of the movie. By this token, a time stamp may be associated with each still image. The time stamps are likewise stored in the file, which is stored on the DVD so as to be accessible to a computer through which the DVD is played or which is responsively coupled to a regular DVD player. The time stamps serve to identify successive frames of the movie and correlate them with corresponding still pictures in the auxiliary file. Thus, it will be understood that the term "time stamp" is intended to encompass any measurable characteristic of movie frames that allows their correlation with still pictures in the auxiliary file. These do not need to be times in a literal sense; rather frames can be numbered sequentially and in this case the "time stamp" of a frame is simply its number within the ordered sequence.

Thus, in effect the DVD medium contains two files: one being the original movie sequence containing video and audio data; and the other being an auxiliary file containing sets of still images, each set corresponding to a specific section of the movie allowing live interaction with the user. Likewise, an auxiliary sound track is constructed corresponding to the original sound track associated with each "interactive section" of the movie file and is stored in the auxiliary file. In the case that variable strength actuation signals are to be fed to the appliance whose strength is dependent on erotic content, data representative of such signals may likewise be stored in the auxiliary file.

Figure 8:
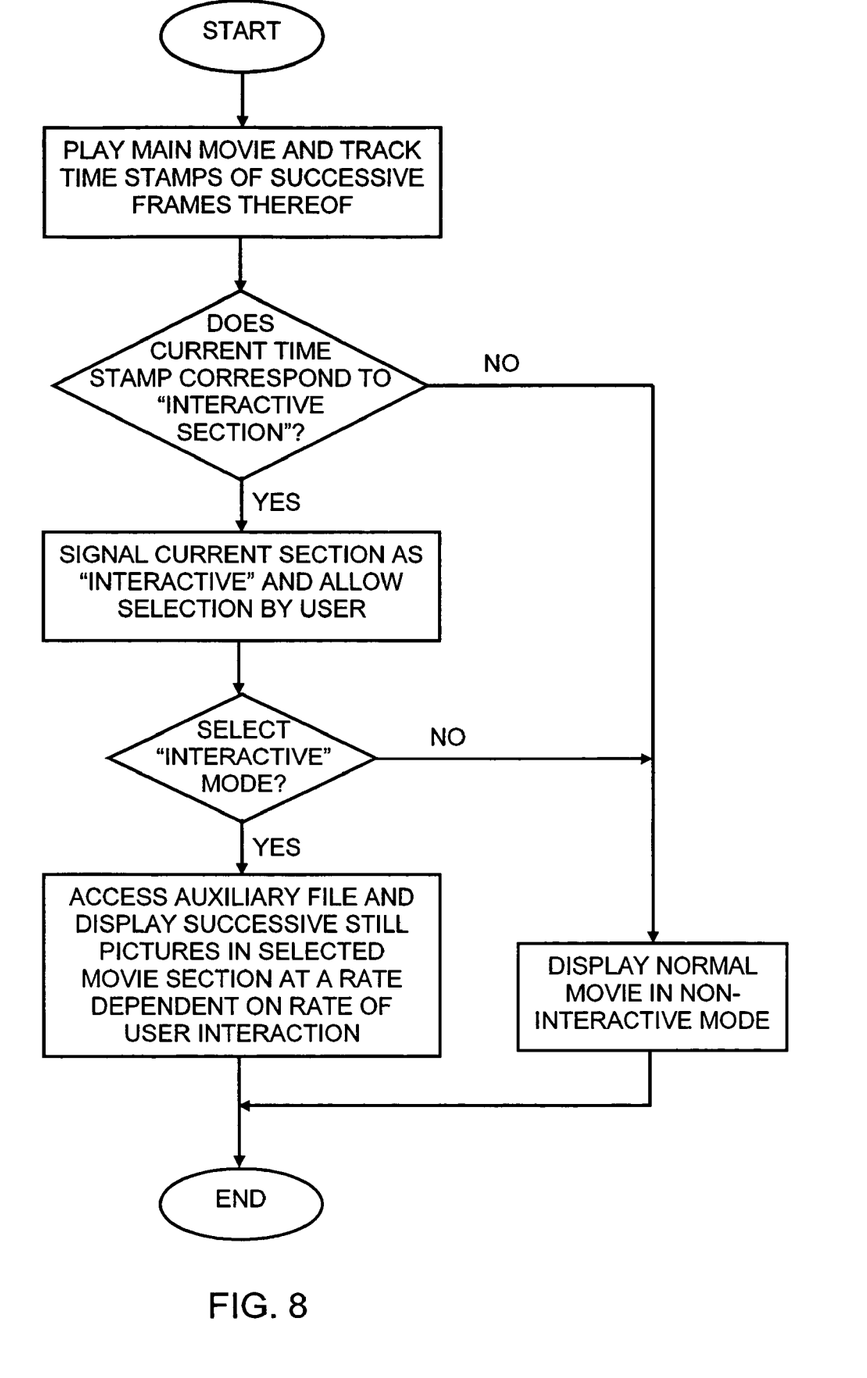
FIG. 8 is a flow diagram showing the principal actions associated with a method for live interaction with the DVD or other video medium formatted according to FIG. 7.

FIG. 8 is a flow diagram showing the principal actions associated with a method for live interaction with the DVD or other video medium formatted according to FIG. 7. In use, when the DVD is played, the computer reads the auxiliary file and infers from the time stamps associated with each "interactive section" of the movie file when each interactive section starts and finishes. The start time associated with each "interactive section" is compared with the actual running time, which of course is known. By such means, the computer can determine when the movie section currently being played has an "interactive section" and is thus amenable to live interaction by the viewer. If so, a marker may be displayed to alert the viewer that he may, if he wishes, interact with the current movie section. Such a marker may, for example, be an icon or text message displayed at the top of the screen. The viewer may be content to continue watching the movie in its original form, in which case he may simply do nothing.

However, if he wishes to interact with the current section, he may switch from regular display mode to interactive display mode whereupon interacting with the appliance causes still images in the auxiliary file to be displayed in fast succession at a rate that is dependent on his rate of interaction with the appliance. At the same time, the auxiliary sound track may be vocalized at a constant rate regardless of the rate of video display so as to avoid changes in pitch to the resulting sound. Provided that a sufficient number of still images is stored for each "interactive section" and that, even for slow interaction with the appliance, they are displayed at a sufficiently high display speed (exceeding 25 frames per second), the resulting display will be free of flicker and will therefore be indistinguishable from the original movie sequence: apart from variations in display rate.

Figure 9:
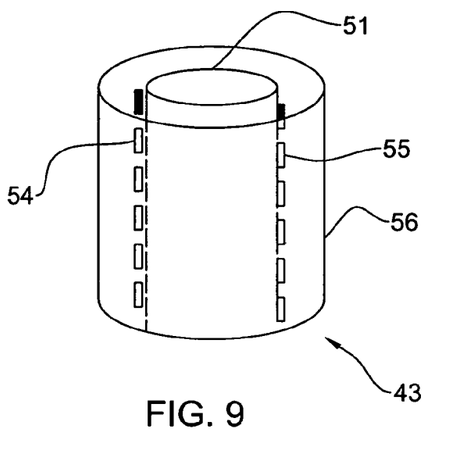
FIG. 9 is a pictorial representation of a penetration sensor for use with the system shown in FIG. 1.
Figure 13:
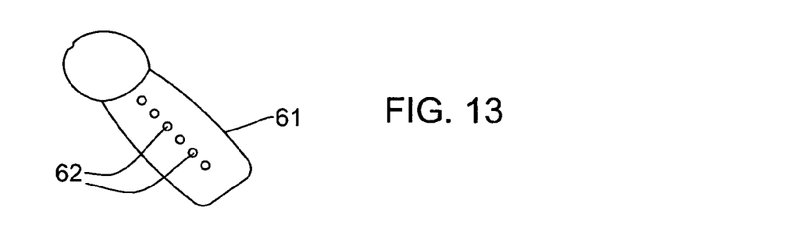
FIG. 13 is a pictorial representation of a different type of penetration sensor for use with the system shown in FIG. 1.

In the case of an appliance such as shown in FIG. 9 or 13 having multiple internal or external sensors disposed along its length, a predetermined number of still images may be associated with each sensor and displayed whenever the respective sensor is activated. Thus, considering the appliance shown in FIG. 9, the faster an object such as a man's penis is inserted into the bore of the appliance, the faster it will actuate the sensors (i.e. the faster will light continuity between successive sensors be interrupted in the embodiment shown in FIG. 11) and the faster the still images will be replayed. At the same time, the processed audio file is played alongside the processed video images so as to recreate the original sound track, which is therefore also indistinguishable from the original movie sequence.

It will be appreciated that the above description relating to the manner in which a video file may be pre-processed to allow interaction during replay is exemplary and many other approaches are possible. Formatting of the auxiliary file as described is appropriate for a DVD or other computer readable medium. It is also suitable for use with new films that may thus be manufactured and sold pre-formatted; or it may be used with existing films that may be post-processed so as to create the auxiliary files, which may then be stored in conjunction with the original movie. It is not directly appropriate to a video cassette tape, which can only be played continuously, it not being possible to jump back and forth to a different part of the video tape mid-sequence. However, one or more auxiliary files may be provided as described above and synchronized with a video tape so as to produce a comparable effect. In such case, of course, the video tape should be played through the computer after loading pre-formatted auxiliary file(s) on the computer. Preferably this is done by the manufacturer or distributor of the video tape so that an auxiliary file may be custom synchronized to the video tape. When the video tape is started the computer is then able to correlate the time stamps of subsequent frames with the still pictures in the auxiliary file. Alternatively, approximate synchronization may also be achieved manually without pre-processing the movie media. In such case, upon reaching the start of the film, the user may set a "sync" icon on the computer so as to set the origin of the movie, so that the time stamps or frame numbers of subsequent movie frames serve to allow determination of the corresponding still pictures in the auxiliary file, where such exist. Such approximate synchronization is not ideal but obviates the need to pre-process the original movie media and most importantly allows the auxiliary files to be sold or otherwise made available independent of the movie medium. This of course is all the more feasible when the medium on which the movie is stored is directly computer readable since the origin may simply be the first frame or may be identified by a special origin frame that serves to define the origin of still pictures in the auxiliary files.

It should also be noted that storing the auxiliary files in conjunction with the original movie does not necessarily require that they be stored on the same computer readable medium, although in practice they normally will be. However, the auxiliary files may be stored on a separate medium (such as a CD-ROM) since in any case during "interactive mode" the computer selects frames for display from the auxiliary file, and it clearly makes no difference to the computer whether the auxiliary file is in the same drive as the movie or in a different drive.

Regardless of whether the origin is stored as part of the movie or can be set independently, the ability to synchronize an auxiliary file with the movie or to ensure that a pre-formatted auxiliary file will be properly synchronized to the movie means that movie suppliers or suitable third parties can supply auxiliary files that correlate to predetermined sections of the movie and allow them to be viewed interactively with an appliance according to the invention. By the same token, different auxiliary files can be provided for use with a given movie and can be sold not only independent of the movie but also discretely so as to allow a user to collect a whole series of auxiliary files associated with a movie. Such auxiliary files may conveniently be downloaded over the Internet, although they can be provided on any suitable computer-readable medium such as floppy disk, disk-on-key, CD-ROM and so on.

The user may also be provided with a sex aid (constituting an appliance) examples of which are described below with reference to FIGS. 9 to 13 of the drawings. Such appliances may be used to enhance the feedback in a manner essentially described in my above-mentioned U.S. Pat. No. 6,793,619.

FIG. 9 shows pictorially a penetration sensor 50 having an internal bore 51 formed of transparent material into which a body member, such as a finger, tongue or penis, may be inserted and having sensor pairs 54, 55 disposed along an outer surface thereof so as to provide an indication of depth of penetration of a member inserted therein. Each sensor pair may comprise an infrared light source 54, such as an LED, and a corresponding pair of staggered infrared detectors 55 mounted on opposite surfaces of the sensor 50, such that light emitted by any one of the infrared light sources 54 strikes two infrared detectors 55. Such a penetration sensor 50 may serve as a surrogate vagina allowing a user to insert a body member so as to activate the sensors at variable rate and pressure. Thus, as the user's member penetrates further into the bore 51, successive sensor signals are produced. The computer may be programmed to display images having stronger erotic content in response to increased penetration. The complete arrangement may be encased within a surrounding housing 56. The body of the penetration sensor 50 may be formed of a plastic molding and the sensors 54 may be encapsulated within the molding or may be mounted on opposite sides thereof prior to assembly within the housing 56.

Figure 10:
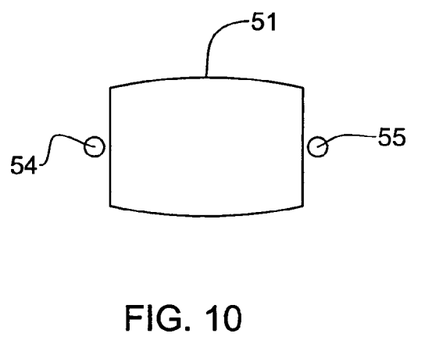
FIG. 10 is a pictorial representation showing a plan view of the penetration sensor depicted in FIG. 9.

FIG. 10 shows a detail of the penetration sensor 50 in plan view. The outer surfaces of the sensor 50 adjacent the infrared light sources 54 and the infrared detectors 55 are flattened either by pre-forming the internal bore 51 with flat sides or by truncating the side-walls or by forming the surrounding housing 56 with flat side walls so that when the internal bore 51 is inserted therein, the material thereof proximate the infrared light sources and detectors is squashed, thereby producing the desired flattening effect.

The flattening of the side walls of the internal bore 51 adjacent the light sources and detectors ensures that light emitted by the infrared light sources 54 propagates directly through the side wall of the penetration sensor 50 and exits the opposite side so as to strike the staggered pair of detectors 55. If a completely cylindrical cross-section were employed, at least some of the light emitted by the infrared light sources 54 would scatter and miss the detectors 55. This would at best reduce the intensity of the signal received thereby and is unsatisfactory.

Figure 11:
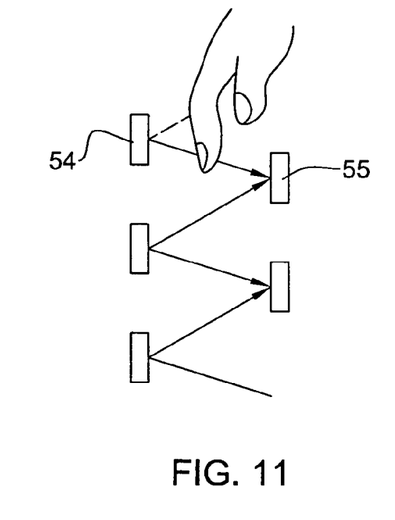
FIG. 11 is a schematic representation of the penetration sensor depicted in FIG. 9 showing its mode of operation.

FIG. 11 is a schematic representation of the penetration sensor 50 showing its mode of operation. Thus, as a user inserts a body member or other object into the internal bore 51 of the sensor, light from the infrared light sources 54 is intersected and one of the corresponding pair of detectors 55 stops receiving a signal. The second detector in the same pair does not stop receiving a signal until the user's finger for example intercepts the second detector. Thus, the time taken between the signal to the first detector being at least partially interrupted and the light to the second detector in the same pair being interrupted is a function of the rate at which the user inserts his finger into the penetration sensor 50.

Figure 12:
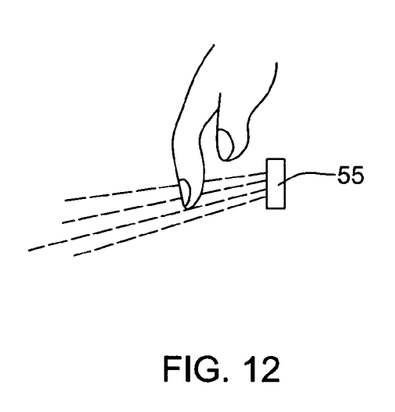
FIG. 12 is a schematic representation of an object intersecting an infrared beam in the penetration sensor depicted in FIG. 9.

FIG. 12 shows schematically a beam of infrared light 56 emitted by one of the infrared light sources 54 striking respective detectors 55. It is seen that a cross-section of the light beam 56 is elongated i.e. oval in shape owing to the staggered displacement of the two detectors 55 relative to the corresponding sensor 54. As a result, as an object is inserted into the penetration sensor 50, it cuts the light beam 56 obtusely (i.e. non-normally) and the width of the cross-section of the light beam 56 that must be traversed by the object before light is fully interrupted from reaching the detector 55 is larger than would be the case if a single detector 55 were disposed directly opposite a light source 54. This allows better discrimination and, in practice, permits a larger number of discrete binary levels to be counted between the object starting to interrupt the beam to the first detector and completely interrupting the beam to the second detector. The resulting higher resolution signal permits more discrete frames of a video sequence to be displayed in the time interval that elapses between the object's penetration between adjacent detectors.

Preferably, the inside surface of the internal bore 51 is formed of an elastic material allowing for radial expansion and contraction depending on the overall width of the body member inserted therein. In such case, some or all of the sensors pairs 54, 55 may be pressure sensors, which produce a signal when acted upon by the body member. A male user suffering from impotence, for example, who inserts his penis into the bore will exert against the inside surface of the bore 51 pressure whose magnitude is a function of his penile width. This, in turn, is clearly correlated with the strength of his erection and thus sensor signals are produced which characterize rate of "pumping" and strength of erection. Since the penis contracts after orgasm, monitoring the depth of penetration allows the moment of orgasm to be determined. The computer 13 or 14 is programmed to display movie-sequence depicting erotic images which may, for example, mirror the patient's actions in response to tactile stimulation of the appliance. It has been found that such images stimulate the patient further and give rise to greater strength of his erection, thus further increasing the pressure on the pressure sensors 54, 55. The computer may be programmed to display images having stronger erotic content, this inducing yet further stimulation and aiding the patient to reduce anxiety and by such means overcome his impotence.

FIG. 13 shows pictorially an alternative embodiment depicting an appliance 60 including a generally cylindrical phallic-shaped member 61 having sensors 62 disposed along an outer surface thereof, for use by female patients in a similar manner. Thus, as the appliance 60 is inserted deeper into the user's vagina, the sensors 62 produce successive signals indicative of depth of penetration. The computer may be programmed to be responsive to the sensor signals for displaying images having stronger erotic content, this inducing yet further stimulation.

The sensors 62 may be micro-switches whose states (open or closed) are toggled when depressed by the walls of the vagina. Alternatively, or additionally, they may produce signals whose magnitude is a function of electrical resistance, this in turn varying as a function of moisture in the vagina and decreasing in inverse proportion to the woman's stimulation. Alternatively, they may be pressure sensors that are activated upon the application of pressure between the appliance and the inside wall of the vagina.

It will be appreciated that although use of the penetration sensor 50 and the appliance 60 has been described respectively with regard to male patients suffering from impotence and to female patients possibly suffering from frigidity, their use is not limited to medical applications and the devices may simply be used to enhance the users' sex play.

The embodiments described above with particular reference to FIGS. 9 to 13 may be supplemented by other sensors in order that the displayed image or the sound track may be varied according to other physiological characteristics. Thus, as noted above, heart rate as well as body temperature and resistance may be monitored, all of these being indicative of the user's state of arousal: the image or sound track being selected in accordance with a combined function of the measured variables.

Likewise, the appliances 50 and 60 may be provided with rotation sensors (not shown) allowing rotation of the appliance to be monitored. Different movie sequences may be stored each in respect of a different orientation of the appliance. Upon rotation of the appliance, a respective signal is produced by the motion sensor allowing the orientation of the appliance to be determined and a different one of the movie sequences to be downloaded. This allows for greater flexibility and range of the appliance.

Furthermore, the appliances shown in FIGS. 9 to 13 may themselves be provided with actuators responsive to signals which are fed together with the movie sequences according to the erotic content thereof, for example. By such means, tactile sensation can be fed back to the user. By way of example, the side walls of the appliance 50 may be contracted by means of a solenoid which is actuated via a signal when the model closes her legs, thereby squeezing the user's penis. The signal may be downloaded from the web site or produced locally by the user's computer in response to data stored in the same computer readable medium as the movie.

The above embodiments have been described with reference to sex play conducted by a user on his or her own self. In practice the sensor 28 is equally well suited to produce signals when one user plays with a partner since in this case too as the user plays with his or her partner, the distance of the sensor 28 from the receiver 27 varies and the computer 13 or 14 can use the varying motion-dependent signals as described above. In either case, the sensor is adapted to be worn on a user's body part for inputting motion-dependent signals to the computer during free motion of the user's body part. Sex play between partners may be enhanced by providing each of the partners with a virtual reality screen, mounted on his or her forehead, so as to project a video to the eyes of the user. The virtual reality screens are coupled to the computer and display successive video frames fed thereto. In use, each partner wears a sensor and may choose a different video for display on his or her respective screen. Actions carried out by one partner on the other are sensed by the respective sensor, and the distance between the sensor and a respective transmitter, determines in real time which frames of each video to feed to the respective screens and the rate of motion determines at what rate to display successive frames.

It will also be appreciated that although the sensor 28 has been described with particular reference to a wrist-mounted device, it may of course be attached to any other suitable body part, which is amenable to motion during sex play in a manner that is both free (i.e. unrestricted) and that varies in a dependable manner as a function of the sex play. So, for example, it could be attached to a user's ankle or forehead and so on.

Although reference has so far been made to a receiver that is fixed, in fact it need not be so long as during sex play measurable displacement occurs between the sensor and the receiver. Thus, in the above scenario describing sex play between two partners, one partner can wear the sensor and the other can wear the receiver so that their mutual stimulation gives rise to the required displacement between the two.

Details of the sensor 28 have not been provided since any suitable sensor that produces a varying signal according to its distance from the receiver 27 may be used. In practice, particularly good results have been achieved using a simple electromagnetic sensor comprising a coil of wire coupled to an oscillator and mounted in a watch-type casing. The receiver 28 comprises a pickup coil for detecting signals transmitted by the sensor coil. The signal intensity varies as a function of the distance of the sensor coil from the pickup coil in the receiver 28 and thus allows determination of distance or a function thereof to be computed. However, other sensors may also be used based, for example, on an optical beam as described in above-mentioned U.S. Pat. No. 6,747,632 to Howard, whose disclosure is incorporated herein by reference.

It should also be noted that certain embodiments have been described by way of example and without detailed description of interrelationship between different embodiments. However, features of one embodiment may be combined with those of other embodiments in a manner which will be readily apparent to those skilled in the art and the appended claims are intended to cover such combinations.

It will also be noted that whilst some preferred embodiments have been described with particular regard to downloading computer-accessible movie sequences and other files through the Internet, the files may be stored locally on a CD-ROM, DVD or other locally accessible media. Likewise, the invention encompasses within its scope a medium containing a movie sequence in addition to computer readable files that contain auxiliary data pertaining to one or more sections of the movie sequence and that allow a viewer to interact with such sections using an appliance according to the invention coupled to a computer.

It should also be noted that while live interaction between a view and a movie has been described with particular regard to the adaptation of a DVD so as to produce a specially formatted medium containing pre-processed files that may be rendered inter-actively, similar principles may be applied to other formats and the invention is certainly not limited to DVDs only. Thus, for example, any suitable movie format may be downloaded through the Internet and processed so as to create auxiliary files in the manner described above with reference to FIG. 7 so as to allow subsequent interaction with a viewer. The processed files may be copied to a computer readable medium such as CD-ROM or DVD. Alternatively, they may be downloaded through the Internet to a user's computer.

Finally, it will be understood that the invention may also be implemented via a computer program product and a machine-readable medium allowing a computer to display to a user computer-accessible movie sequences of a predetermined subject in accordance with tactile-dependent signals received from the user. The computer may be a web server coupled via the Internet to a client computer to which images are downloaded for display; although as noted above the client computer may be standalone and adapted to read data that is local thereto.

The invention claimed is:

1. A computer-implemented method for providing feedback during sex play, the method comprising:
   using a sensor worn on a user's body part to input motion-dependent signals to a computer during free motion of said body part;
   accessing a plurality of computer-accessible erotic movie sequences; and
   displaying on a display device connected to the computer successive ones of said erotic movie-sequences in accordance with said motion-dependent signals.

2. The method according to claim 1, further including associating a sound-sequence with at least one of the movie-sequences so as to reproduce a sound track with the at least one movie-sequence.

3. The method according to claim 1, further including:
   sensing auxiliary signals representative of respective physiological variables of the user,
   selecting one of the movie-sequences in accordance with a function of the sensed physiological variables.

4. The method according to claim 1, further including:
   receiving actuation signals representative of a specified function of the at least one movie-sequence, and
   controlling an auxiliary property of a hand-held sex appliance with the actuation signals.

5. The method according to claim 1, wherein displaying successive erotic movie-sequences includes:
   accessing a computer-readable medium having stored thereon a movie at least one section of which is to be configured for interactive viewing;
   selecting one or more sections for interactive viewing;
   accessing a computer-readable file containing respective still images associated with each selected section of the movie and being synchronized therewith; and
   successively displaying respective still images associated with each selected section of the movie such that a succession of still images has at least one characteristic that varies in accordance with said sequence of tactile-dependent signals.

6. The method according to claim 5, wherein the at least one characteristic is a rate at which said still images are displayed being dependent on a rate of movement of the user's body part.

7. The method according to claim 1, wherein the erotic movie sequence is a live movie sequence.

8. The method according to claim 5, wherein the erotic movie sequence is a live movie sequence.

9. The method according to claim 4, further including:
   for each of said at least one image relating storing at least two computer accessible movie sequences each in respect of a different orientation of the appliance,
   detecting an orientation of the appliance, and
   selecting a respective one of the at least two computer-accessible movie sequences in accordance with the orientation of the appliance or to a shift in the orientation thereof.

10. The method according to claim 1, including:
    displaying the erotic movie-sequences at a location remote from said user, communicating stimulating feedback signals to the user based on the erotic movie-sequences.

11. The method according to claim 10, wherein the stimulating feedback signals are communicated by a virtual partner in an on-line "chat" session.

12. The method according to claim 10, wherein respective stimulating feedback signals are communicated between two or more partners during sex play.

13. The method according to claim 12, including:
attaching a respective display device within a line of vision of each of said partners;
attaching at least one sensor to a first one of said partners; and
attaching at least one receiver to a second one of said partners;
so that mutual stimulation during sex play causes mutual displacement between the at least one sensor and the at least one receiver.

14. A computer-implemented system for providing feedback during sex play, the system comprising:
a computer coupled to a memory storing therein a plurality of computer accessible erotic movie sequences,
a sensor adapted to be worn on a user's body part for inputting motion-dependent signals to the computer during free motion of said body part, and
a display device connected to the computer for displaying successive ones of said erotic movie-sequences in accordance with said motion-dependent signals.

15. The system according to claim 14, further including a receiver adapted to be coupled to the computer for receiving said motion-dependent signals and inputting corresponding signals to the computer.

16. The system according to claim 14, including auxiliary sensors for measuring auxiliary signals representative of respective physiological variables of the user, whereby the movie-sequences are selected in accordance with a function of the measured auxiliary signals.

17. The system according to claim 14, wherein:
a sound-sequence is associated with at least one of the movie-sequences so as to reproduce a sound track with the at least one movie-sequence, and
a loudspeaker is coupled to the computer for vocalizing the sound-sequence.

18. The system according to claim 14, wherein:
the sensor is coupled to a hand-held sex appliance having at least one actuator for controlling an operating characteristic associated therewith,
the computer is responsive to the at least one movie-sequence for feeding corresponding actuating signals representative of a specified function of the at least one movie-sequence to the at least one actuator for controlling the operating characteristic of the hand-held sex appliance.

19. The system according to claim 18, wherein:
for each of said erotic movie sequences the memory stores therein at least two computer-accessible movie sequences each in respect of a different orientation of the appliance,
at least one motion sensor is coupled to the appliance for detecting an orientation thereof, and
the computer is responsive to the orientation of the appliance or to a shift in the orientation thereof for selecting a respective one of the at least two computer-accessible movie sequences.

20. The system according to claim 14, wherein the memory is a bulk storage medium such as a CD ROM or DVD.

21. The system according to claim 14, wherein the memory is coupled to the computer remotely.

22. The system according to claim 21, wherein the memory is associated with a remote server accessible to the computer via the Internet.

23. The system according to claim 21, further including:
a remote display device for displaying the erotic movie-sequences at a location remote from said user, and
a communication channel between the user and said location for communicating stimulating feedback signals to the user based on the erotic movie-sequences.

24. The system according to claim 23, wherein the stimulating feedback signals are communicated by a virtual partner in an on-line "chat" session.

25. The system according to claim to claim 21, wherein respective stimulating feedback signals are communicated between two or more partners during sex play for causing respective erotic movie-sequences to be displayed to each of said partners.

26. The system according to claim 25, including:
two or more display devices each adapted for attaching within a line of vision a respective one of said partners;
at least one sensor being mounted on a first one of said partners and at least one receiver being mounted on a second one of said partners and adapted to be coupled to the computer for receiving said motion-dependent signals and inputting corresponding signals to the computer so that mutual stimulation during sex play causes mutual displacement between the at least one sensor and the at least one receiver.

27. The system according to claim 14, wherein the computer is adapted to:
access a computer-readable medium having stored thereon a movie at least one section of which is to be configured for interactive viewing;
select one or more sections for interactive viewing;
access a computer-readable file containing respective still images associated with each selected section of the movie and being synchronized therewith; and
successively display respective still images associated with each selected section of the movie such that a succession of still images has at least one characteristic that varies in accordance with said sequence of motion-dependent signals.

28. The system according to claim 27, wherein the memory is a bulk storage medium such as a CD ROM or DVD.

29. The system according to claim 14, wherein, wherein the memory is coupled to the computer remotely.

30. The system according to claim 18, wherein the appliance is shaped to resemble a human body part.

31. The system according to claim 30, wherein the appliance includes a generally cylindrical member having sensors disposed along an outer surface thereof.

32. The system according to claim 30, wherein the appliance includes a flexible bore having sensors disposed along an inside surface thereof.

33. The system according to claim 32, wherein said bore is formed of an elastic material allowing for radial expansion and contraction depending on an overall width of a member inserted therein.

34. The system according to claim 32, wherein the sensors are disposed along a length of said bore so as to provide an indication of depth of penetration of a member inserted therein.

35. A computer-implemented computer program product comprising a computer useable medium having computer readable program code embodied therein for providing feedback during sex play, the computer program product comprising:

computer readable program code for causing the computer to receive input motion-dependent signals from a sensor worn on a user's body part during free motion of said body part;

computer readable program code for causing the computer to access a plurality of computer-accessible erotic movie sequences; and     computer readable program code for causing the computer to display on a display device connected to the computer successive ones of said erotic movie-sequences in accordance with said motion-dependent signals.

* * * * *